United States Patent
Schoeberl et al.

(10) Patent No.: US 7,119,733 B2
(45) Date of Patent: Oct. 10, 2006

(54) ANGLE-SCANNING RADAR SYSTEM

(75) Inventors: Thomas Schoeberl, Hildesheim (DE); Thomas Focke, Ahrbergen (DE); Dirk Mansen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 10/741,989

(22) Filed: Dec. 19, 2003

(65) Prior Publication Data

US 2004/0164891 A1    Aug. 26, 2004

(30) Foreign Application Priority Data

Dec. 20, 2002 (DE) ................. 102 59 863

(51) Int. Cl.
- G01S 13/68 (2006.01)
- G01S 13/93 (2006.01)
- H01Q 3/26 (2006.01)

(52) U.S. Cl. .................. 342/70; 342/373; 342/374
(58) Field of Classification Search .............. 342/70, 342/71, 373, 374; 455/83

See application file for complete search history.

(56) References Cited

U.S. PATENT DOCUMENTS

| | | | |
|---|---|---|---|
| 4,408,205 A | 10/1983 | Hockham | |
| 4,641,144 A * | 2/1987 | Prickett | 343/754 |
| 4,882,588 A * | 11/1989 | Renshaw et al. | 342/373 |
| 5,128,687 A * | 7/1992 | Fay | 342/376 |
| 5,682,165 A | 10/1997 | Lewis et al. | |
| 5,717,399 A | 2/1998 | Urabe et al. | |
| 5,757,308 A * | 5/1998 | Lissel et al. | 342/70 |
| 5,905,458 A | 5/1999 | Ashihara | |
| 5,995,062 A | 11/1999 | Denney et al. | |
| 6,085,151 A | 7/2000 | Farmer et al. | |

FOREIGN PATENT DOCUMENTS

| | | | |
|---|---|---|---|
| DE | 196 44 686 | | 4/1998 |
| EP | 0 684 486 | | 11/1995 |
| EP | 0 707 220 | | 4/1996 |
| EP | 0 758 093 | | 4/1999 |
| GB | 2249448 | * | 5/1992 |
| WO | WO 01/09975 | | 2/2001 |
| WO | WO 02/15334 | | 2/2002 |

* cited by examiner

*Primary Examiner*—Ian J. Lobo

(57) ABSTRACT

An angle scanning radar system having a group antenna controlled via a beam-shaping network, a coupling device that allows the group antenna to be operated for both the transmitting and receiving directions, and a device to mix radar receiving signals with radar transmitting signals to form a mixed baseband signal, and to digitally evaluate the mixed baseband signal with regard to the solid-angle information.

12 Claims, 1 Drawing Sheet

ANGLE-SCANNING RADAR SYSTEM

FIELD OF THE INVENTION

The present invention relates to an angle-scanning radar system.

BACKGROUND INFORMATION

Radar systems for motor-vehicle applications, in particular driver-assistance systems such as ACC (Automatic Cruise Control) systems, which are based on the radar principle, may require a directionally resolved image of the vehicle surroundings (distance information/angle information) for evaluation. In determining the angle, current systems may operate according to monopulse methods, which are based on a comparison of amplitudes and phases of several reception directivity characteristics. These methods may achieve a sufficient resolution in a relatively narrow visual range, as long as only one target is situated in a distance/velocity cell. If a plurality of targets is situated in one cell, incorrect angles may result.

A multibeam antenna system having a plurality of radiator elements, which are coupled to a beam-shaping network that takes the form of a Butler matrix is discussed in PCT application number WO 02/15334 A1. The Butler matrix is connected to a switchable beam-combination network. Used there for the transmitting and receiving directions are antenna pairs, whose radiation patterns can be simultaneously controlled, in order to ensure that they point in the same direction.

A set-up for calibrating a transmitter and/or receiver for controlling a beam-forming network is referred to in German Published Patent Application No. 196 44 686. This allows the same beam characteristic to be set for transmit and receive modes, without the highly precise transmitter or receiver being necessary. An automatic calibration system for radar applications is referred to in U.S. Pat. No. 5,682,165. A radar sensor having a Rotman lens and group antenna is referred to in PCT application number WO 01/09975 A2. A control circuit takes the form of a transmitting and receiving module. Separate sensitivities can be set for different angular segments, in order to detect objects in an angularly resolved manner. In addition, distances and speeds, particularly with respect to preceding vehicles, can be determined. The evaluation is performed digitally.

SUMMARY OF THE INVENTION

According to an exemplary embodiment and/or method of the present invention, in the case of spatial filtering of radar echoes, a high degree of flexibility may be achieved, i.e. by an analog beam-shaping network, a group antenna having a plurality of radiator elements, a coupling device for operating the group antenna for both the transmitting and receiving directions, and a device for mixing radar receiving signals for, in particular, digitally evaluating the solid-angle information on the basis of the mixed baseband signal. In particular, there is multitarget capability within one distance cell. A larger visual range may also be covered.

The mixed baseband signal may easily be digitally sampled and digitally evaluated for further processing. The beam-shaping network may be made up of an HF structure, configuration or arrangement for splitting an oscillator transmitting signal among N paths with corresponding phase and/or amplitude weighting. This allows a multitude of directivity characteristics to be attained. Radar echos may be reliably assigned to objects in both the long range and the short range, using a separate changeover device for changing the antenna characteristic with regard to its angular width. This changeover device may advantageously be made up of micro-electromechanical switches or PIN diode switches. The switchover may advantageously be configured to be adaptive or to operate as a function of the velocity.

The phase and amplitude interference introduced by the beam-shaping network may be calibrated out in a simple manner. A Rotman lens or Butler matrix may advantageously be provided as a beam-shaping network. The radar system according to the present invention is suitable for motor-vehicle radar applications. An ACC system or a stop-and-go system may be set up by a simple changeover.

BRIEF DESCRIPTION OF THE DRAWING

The FIGURE shows a block diagram of a radar system according to the present invention.

DETAILED DESCRIPTION

Figure 1:
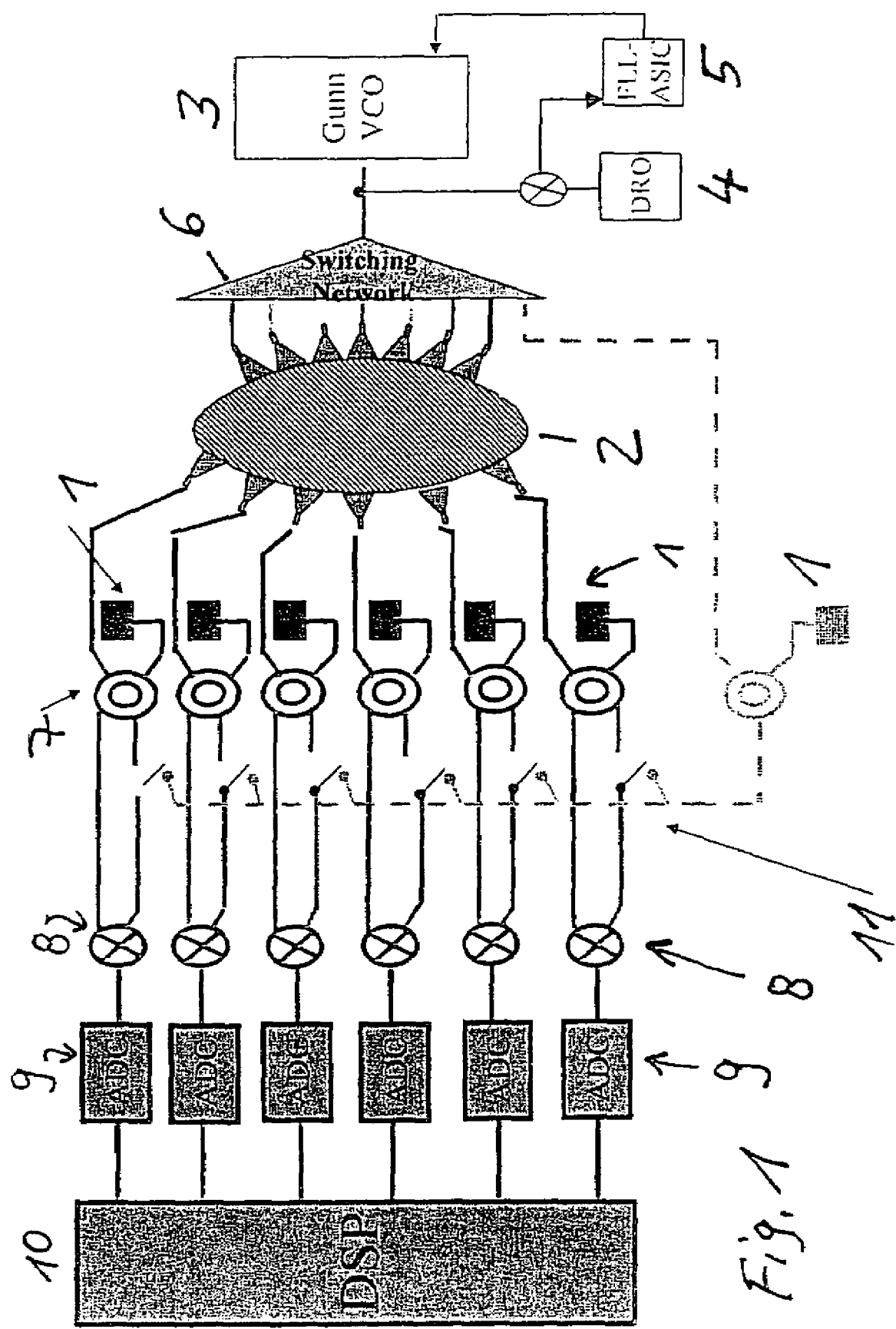

In the radar system according to an exemplary embodiment of the present invention, beam shaping and/or evaluation of spatial information simultaneously takes place in the transmitting and receiving directions. As shown in FIG. 1, a group antenna having N radiator elements 1 (in this case, N openings) is used in the radar system according to an exemplary embodiment of the present invention. An FMCW-radar principal is used as an exemplary embodiment. The radar system of the present invention may also be applied to other ones (principals), e.g. pulse radar.

The core part of the beam shaping in the transmission direction is an analog HF configuration as a beam-shaping network 2, e.g. in the form of a Butler matrix or Rotman lens of a phase-shifter network. The "one-dimensional" FMCW transmitting signal, which is conditioned, for example, by a Gunn VCO 3 having a carrier oscillator DRO 4 and FLL (frequency lock loop) ASIC 5, is transmitted by a switching network 6 to the input of the analog beam-shaping network. Switching network 6 may be realized by MEMS (microelectromechanical switches). The selection of the input determines the directivity characteristic in the transmission direction. The exact shape of the antenna characteristic is determined by the configuration or arrangement of beam-shaping network 2. Since each input is assigned exactly one antenna characteristic in these beam-shaping configurations, M different characteristics result in the case of M inputs. This means that, on the transmission side, the solid angle to be scanned is only covered in a very roughly sampled manner. The number of outputs of beam-shaping configuration 2 is identical to number N of antenna elements 1.

By selecting a cleverly contrived network, both transmitting and receiving may be accomplished by the same antenna. In this connection, the separation into transmitting and receiving paths is accomplished, in each instance, by a coupling device, e.g. a so-called coupling hybrid. In addition, in switching network 6, one can switch over between the above-described beam shaping and very broad radiation (emission) through or by only one or two antenna openings. Then, the transmitting signal does not run through the Rotman lens and/or Butler matrix. For this operating state, the transmitting signal must be separately fed to mixers 8 (dotted-line signal path in FIG. 1), which are necessary for the reception path. A separate switchover device 11 made up of, e.g. MEMS is necessary for this.

The N-dimensional, received signal is coupled out on the receiving side by coupling device 7, in exactly the same manner as the oscillator signal, which is, however, phase-weighted at this location as a function of beam-shaping network 2 (Rotman lens, etc.). This phase and amplitude weighting is well-known and can be corrected (calibrated out) again during the signal processing (cf. DE 196 44 686, for example). The received signal and transmitted signal are directed to a device for mixing, or are directed, in each instance, to a mixer 8 for each of the N paths and appropriately mixed into the baseband. The resulting signal is sampled/scanned by analog-digital converters 9 and may be evaluated, using digital signal processing 10.

Appropriate evaluation algorithms for obtaining the solid-angle information or amplitude information of targets are available and are not further explained here. A point of an exemplary embodiment of the present invention is the more favorable implementation of an analog beam-shaping network in the transmission direction, combined with digital processing of the received radar-sensor signals. The same antenna is used in both the transmitting direction and the receiving direction. This combination provides or should provide a high degree of flexibility in the spatial filtering of the radar echoes. Multitarget capability within one distance cell is meant by this. Switching from a highly directional transmission characteristic for detection in far-away regions to a very broad transmission characteristic for very short range is also provided for in the exemplary embodiment. This switchover may occur, for example, as a function of velocity, or adaptively.

What is claimed is:

1. An angle-scanning radar system comprising:
   an analog beam-shaping network in a transmitting direction;
   a group antenna including a plurality of radiator elements;
   a coupling device to operate the group antenna in both the transmitting direction and a receiving direction;
   a device to form a mixed baseband signal by mixing radar receiving signals and radar transmitting signals; and
   a unit for generating radar signals, including the beam-shaping network, to split an oscillator transmitting signal into N paths having at least one of a corresponding phase weighting and an amplitude weighting.

2. The angle-scanning radar system of claim 1, wherein the device operates to evaluate at least solid-angle information based on the mixed baseband signal.

3. The angle-scanning radar system of claim 2, wherein the radar receiving signals include radar echoes received from a single reception cell, and the device operates to spatially filter the radar echoes along the lines of a multi-target capability within the single reception cell.

4. The angle-scanning radar system of claim 1, further comprising:
   a switchover device to change an antenna characteristic.

5. The angle-scanning radar system of claim 4, wherein the antenna characteristic includes an angular width, and wherein the switchover is from a highly focused directivity characteristic for a long range and a broad emission for a short range.

6. The angle-scanning radar system of claim 5, wherein the change in the angular width may be controlled one of adaptively and as a function of velocity.

7. The angle-scanning radar system of claim 4, wherein the switchover device includes micro-electromechanical switches or PIN diode switches.

8. The angle-scanning radar system of claim 7, wherein the switches are provided in the N paths of the split oscillator transmitting signal.

9. The angle-scanning radar system of claim 1, further comprising a calibrating arrangement to calibrate out at least one of a phase and an amplitude interference introduced by the beam-shaping network.

10. The angle-scanning radar system of claim 1, wherein the beam-shaping network includes one of a Rotman lens and a Butler matrix.

11. The angle-scanning radar system of claim 1, wherein the angle-scanning radar system is configured for use in a motor-vehicle system.

12. The angle-scanning radar system of claim 11, wherein the motor-vehicle system includes one of an automatic cruise control system and a stop-and-go system.

* * * * *